No. 12,724. REISSUED NOV. 26, 1907.
S. COHN.
MACHINE FOR SEWING TUBULAR STRUCTURES.
APPLICATION FILED OCT. 2, 1906.
3 SHEETS—SHEET 1.
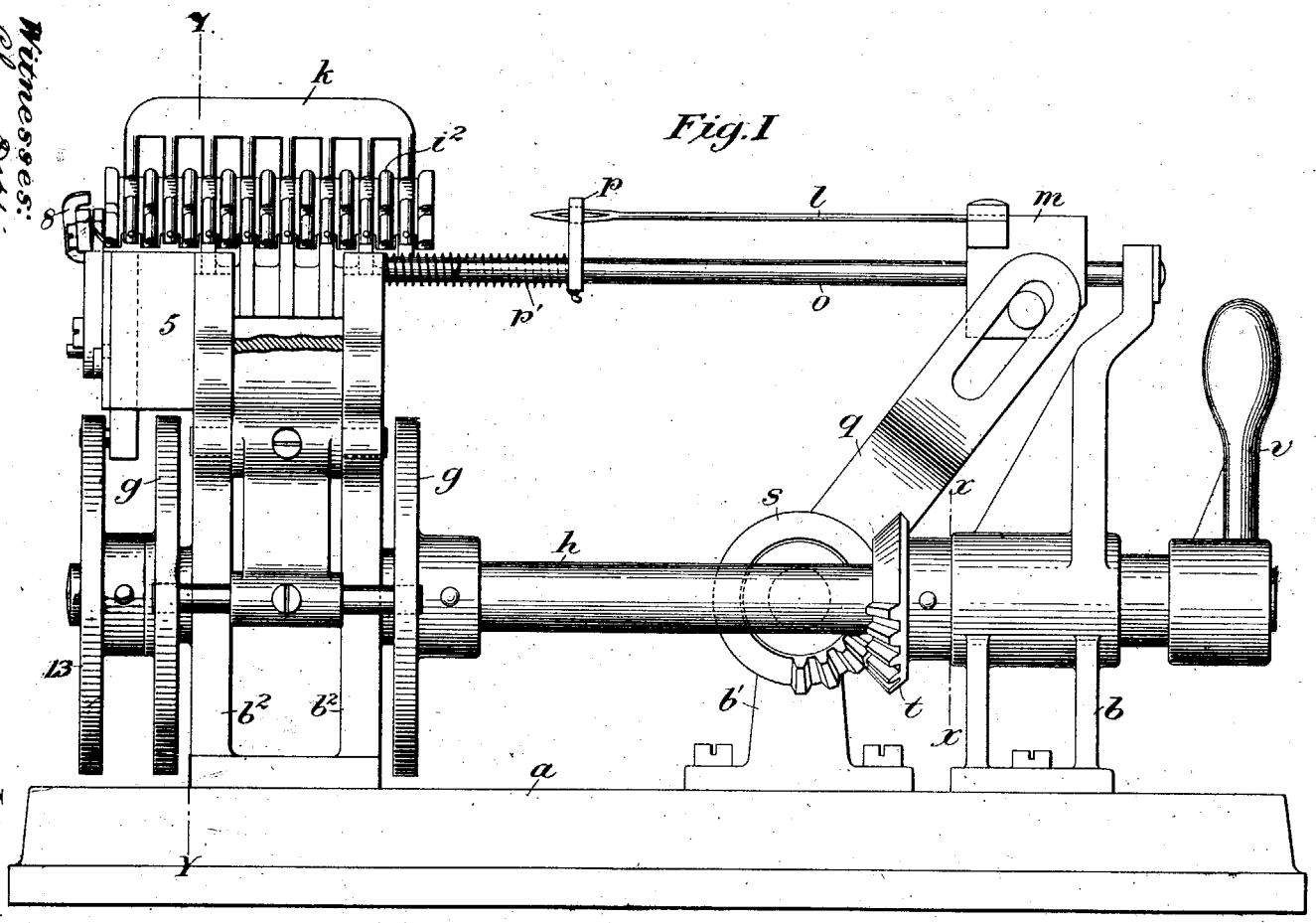
Witnesses:
Chas. D. King
A. Holmes
Inventor:
Samuel Cohn
by Geo. E. Maxwell
Atty No. 12,724. REISSUED NOV. 26, 1907.
S. COHN.
MACHINE FOR SEWING TUBULAR STRUCTURES.
APPLICATION FILED OCT. 2, 1906.
3 SHEETS—SHEET 2.
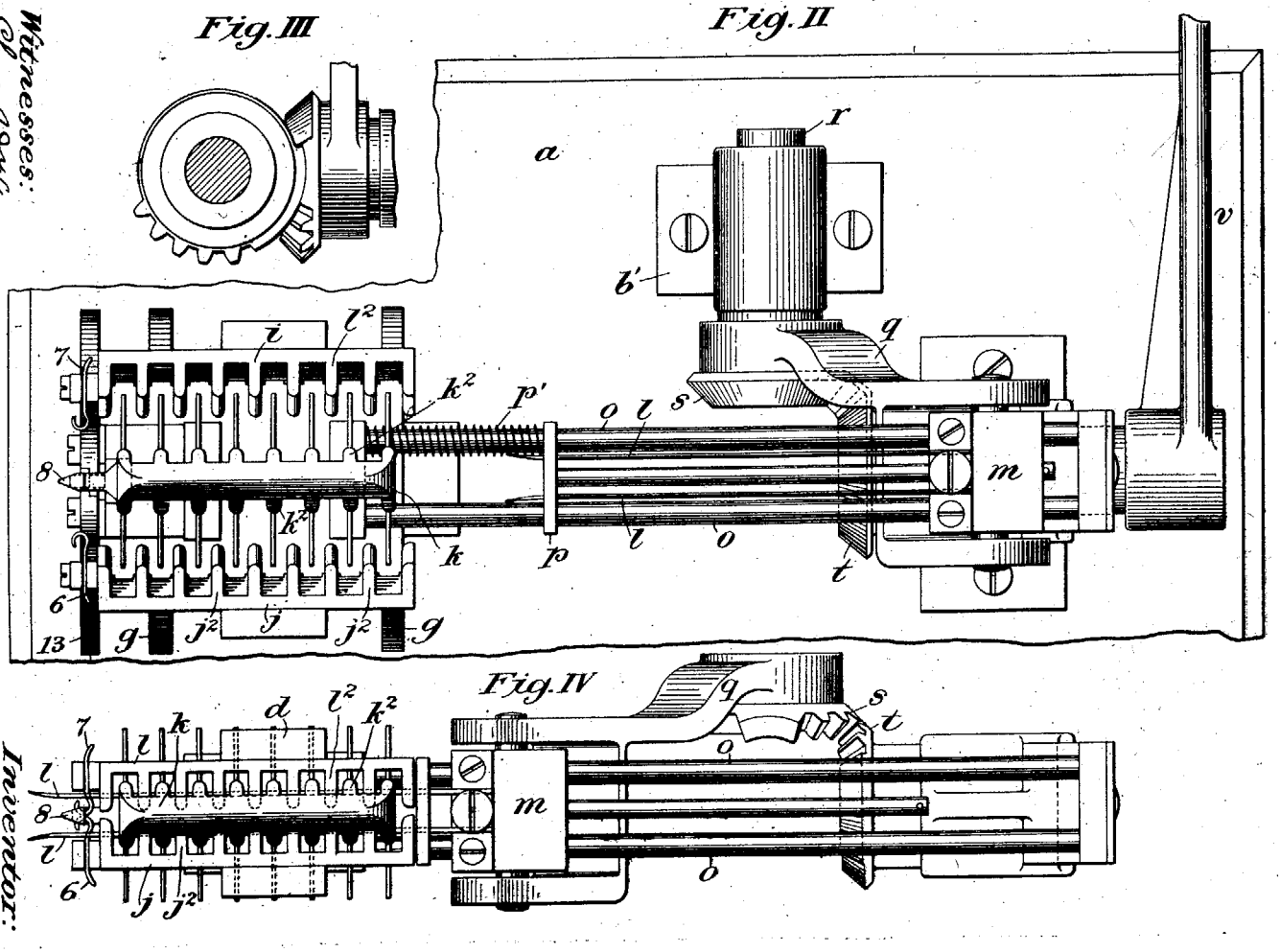
Witnesses:
Chas. D. King.
A. Holmes
Inventor:
Samuel Cohn
by Geo. P. Morse
Atty.

No. 12,724. REISSUED NOV. 26, 1907.
S. COHN.
MACHINE FOR SEWING TUBULAR STRUCTURES.
APPLICATION FILED OCT. 2, 1906.
3 SHEETS—SHEET 3.
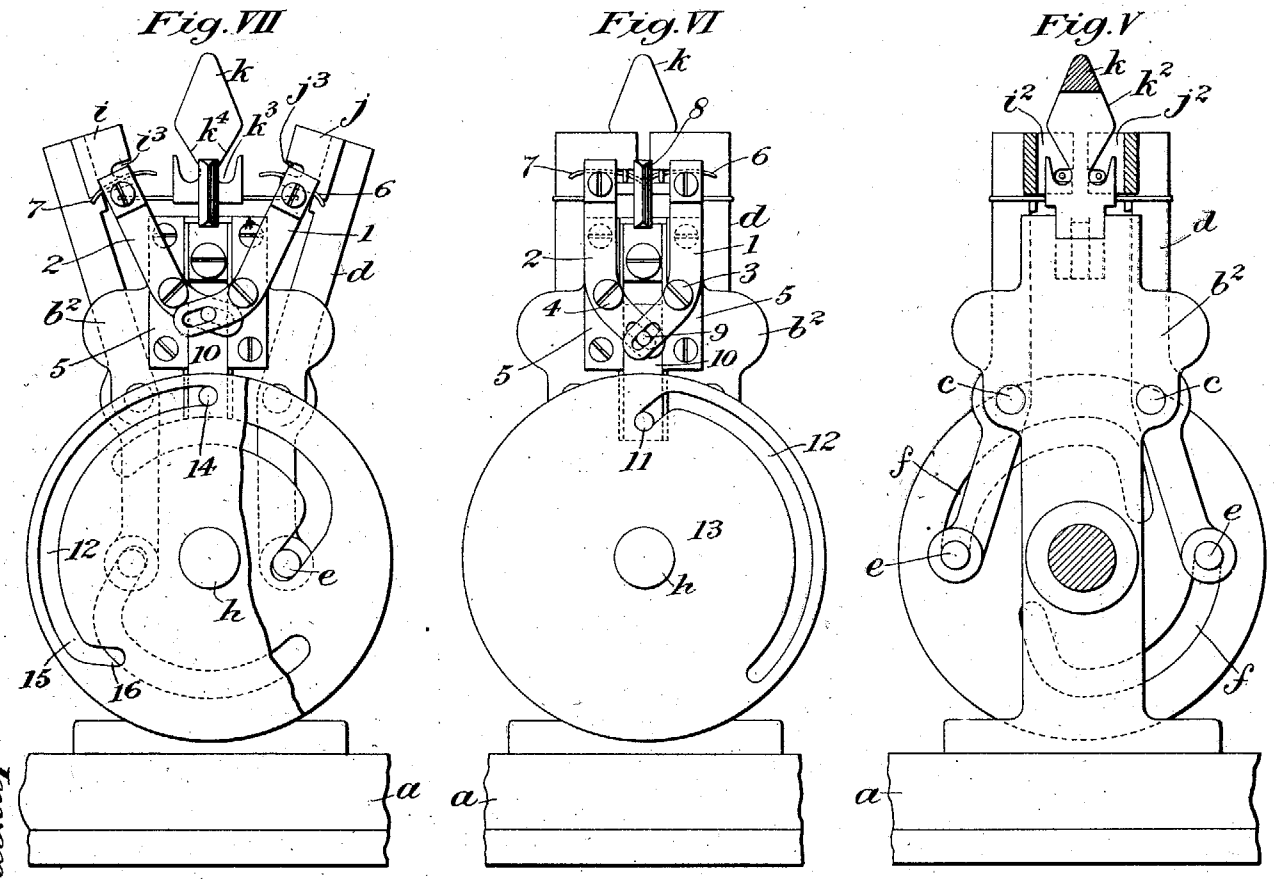
Witnesses:
Chas. D. King.
A. Holmal
Inventor:
Samuel Cohn
by Geo. E. Maud
Atty.

UNITED STATES PATENT OFFICE.

SAMUEL COHN, OF NEW YORK, N. Y.

MACHINE FOR SEWING TUBULAR STRUCTURES.

No. 12,724. Specification of Reissued Letters Patent. Reissued Nov. 26, 1907.

Original No. 798,090, dated August 29, 1905, Serial No. 207,055. Application for reissue filed October 2, 1906. Serial No. 337,127.

*To all whom it may concern:*

Be it known that I, SAMUEL COHN, a citizen of the United States, residing in the borough of the Bronx, county of Westchester, city and State of New York, have invented certain new and useful Improvements in Machines for Sewing Tubular Structures, of which the following is a specification.

My invention relates to machines for sewing tubular structures, and will be described with particular reference to the type of machine shown in the accompanying drawings by way of illustration, although it will be understood that the invention is not limited thereto.

In the drawings I have shown a machine of the type now commonly known as the "Cohn" type, in which the tubular structures receive the gathering threads, but at the same time remain open tubular structures and are not gathered into a head, as in the case of other types of machines heretofore proposed. The gathering is subsequently performed by drawing upon the threads. The object of leaving the ends of the tubes open is to enable me to put in a greater number of bends or corrugations than is possible in the type of machine wherein it is proposed to sew and gather the head at one operation.

The device finds its readiest application when employed in sewing or gathering the heads of incandescent mantles and for the purposes of explanation such use will be hereinafter referred to by way of illustration.

In the drawings, Figure I is a side elevation of a machine in which my present invention is embodied; Fig. II is a broken-away plan view of the machine shown in Fig. I with the jaws open; Fig. III is a fragmentary detail view showing the mutilated gear for moving the needles, the section being taken on the line $x$, $x$, of Fig. I; Fig. IV is a similar plan view with the jaws closed; Fig. V is a section on line $y$, $y$, of Fig. I, showing the means for operating the movable jaws; Fig. VI is an end view of the machine, showing the threader-operating mechanism with the threading devices about to go into operation to draw different portions of the same thread in opposite directions through the eyes of the needles; and Fig. VII is an end view of the machine, showing the jaws open and the threading devices away from their operating positions, which position is assumed by the machine when the operation of sewing the head of the mantle is about to begin.

I will now describe the machine in detail and its method of operation.

It will be obvious that the machine can be operated either by hand or by power; but for the purposes of illustration I have shown a hand operated machine without tending to limit myself thereto.

In the drawings; $a$ indicates a suitable base, upon which are mounted suitable standards $b$, $b^1$, $b^2$. Pivoted into the standards $b^2$ by pivots $c$ are jaw-carrying arms $d$, which jaw-carrying arms are provided with pins $e$ at or near their lower ends, which pins enter slots $f$ of the cam-plates $g$, carried upon the main operating-shaft $h$ of the machine. The jaw-carrying arms $d$ carry suitable grasping-jaws $i$, $j$, (best seen in the plan views Figs. II and IV.) The jaw $i$ is provided with suitable teeth $i^2$ with intervening depressions, and the jaw $j$ is provided with suitable teeth $j^2$ with intervening depressions. These teeth are provided with slots $i^3$ in the case of the teeth $i^2$ and $j^3$ in the case of the teeth $j^2$.

Mounted upon the framework of the machine, to wit, on the standards $b^2$—is a suitable toothed member $k$, having at both sides thereof teeth $k^2$, which mesh with the teeth $i^2$ of the jaw $i$ and teeth $j^2$ of the jaw $j$. The said teeth are slotted, as shown at $k^3$. These slots are upwardly inclined, and the toothed member is provided with inclined faces $k^4$, the inclined slots and inclined faces serving to readily disengage the mantle from the device, as will be fully explained hereinafter. The slots $k^3$, are, as will be seen in Fig. V, entirely closed by the movable jaws, so that a clear passage or channel, constituted by the slots $k^3$ and the slots $j^3$ in the teeth $j^2$ is left for the passage of needles. In the present instance I have shown two needles $l$, which are adapted to pass through the slots in the teeth of the jaws and toothed member $k$. These needles are preferably removably carried upon a suitable needle-carrier $m$, which is adapted to slide upon guides or guide-rods $o$, carried upon the framework of the machine between the standards $b$ and $b^2$. A suitable guide plate $p$ is adapted to slide upon the guide rods, $o$, $o$ which guide-plate is suitably slotted to form a guide for the needles and is restored to its initial position by means of a suitable spring or springs $p^1$ surrounding the guide rods $o$, $o$. It will be observed that the needle guide as herein constituted is a moving guide, which not only performs the function during important periods of its movement but is moved back out of the way in order to permit the operator to slip the mantle over the center member without danger of personal injury. It will thus be observed that the spring $p^1$, in addition to exercising a cushioning effect, actually serves to control the forward movement of the needles at or near the end of their stroke, thus performing the important function of regulating the extent of travel of the needles at an important period of this movement. The needle-carrier $m$ is pivotally connected to a lever $q$, which is carried by a stub-shaft $r$, journaled in the bracket $b^1$. This stub-shaft $r$ is provided with a mutilated pinion $s$, which meshes with the mutilated pinion $t$ of the main shaft $h$, journaled in the bracket $b$. It will be observed that the center member comprises two parts, viz:—angular means for opening up the mantle with proper supports for said opening-up device, the said opening-up device being flanked by corrugating means, to wit, the toothed portions thereof extending in the same direction from the base on opposite sides of the center member so as to form between them a free space for the passage of the needles, the said space being of the general character of a slot opening away from the said base in the direction in which the opening means extends.

The operation of the device thus far described is as follows:—A mantle with a suitable hem turned up is placed over the center toothed member $k$ and the operating-handle $v$ on the shaft $h$ or other operating means is turned. This will have the effect of causing the slots in the cam-plates $g$ to close the jaws $i$, $j$, firmly against the toothed member $k$, thereby bending or corrugating the mantle-mouth into the desired configuration. The jaws are shown in their closed position in Figs. IV and V. At the same time the needles will be advanced through the medium of the mutilated gear, the arm $d$, and the needle-carrier $m$, and running in the slots or the toothed members or jaws will pass through the mantle fabric after the manner of a running-stitch sewing machine, and, as shown in Fig. IV, will project beyond the mantle and be ready to receive their thread. It is obvious, therefore, that while the thread may be inserted by hand an automatic threading device would be desirable. To these ends I have provided an automatic threading device which will now be described before further description of the needle-operating mechanism, it being premised, however, that the toothed portions of the mutilated gear have reached such position that they no longer mesh with each other, and further movement of the handle $v$ will not be effective to move the needles until such movement is reversed and the active portions of the gears are again brought into contact.

Referring now particularly to Figs. II, IV, VI, VII, I have shown a pair of arms 1, 2, which are pivoted, respectively, at 3 and 4 on extensions 5 of the bracket $b^2$. These arms 1, 2 carry hooks 6, 7, which when the threader is in its closed position pass through the eyes of the needles (see Figs. II and VI) and cooperate with a thread-guide and support 8 at the end of the center member $k$, which thread-guide is clearly shown in end view in Fig. VI and in plan view in Fig. IV. The tails of the arms 1 and 2 are slotted and embrace a pin 9, carried upon a vertical guide-slide 10, provided with a bowl 11, entering a cam-slot 12, in a cam-disk 13, carried on the main shaft $h$ of the machine. Rotation of the shaft $h$ serves to oscillate the threader members, as shown in Figs. VI and VII. The operation is as follows:—While the jaws were going into position and the needles were piercing the fabric the threader members remained at rest, for the reason that the bowl 11 was traversing the concentric portion 14, 15 of the cam-slot 12. However, when the needles have gotten into position to receive the threads further movement of the shaft $h$ bring the portion 16 of the cam-slot 12 into section, thereby drawing the bowl 11 and slide 10 downward and swinging the threader members into position to receive the thread, as shown in Figs. IV and VI. The ends of a small length or loop of thread is now laid over the hooks 6, 7 and the thread-guide 8, and by reversing the movement of the arm $v$ the threaders pull different portions of the same thread in opposite directions through the eyes of the needles. The needles retire, pulling the threads through the fabric, and the jaws open, leaving the mantle free to be drawn from the center toothed member $k$, the inclination of the slots of the said member facilitating the passage of the thread so that the mantle will not catch in the machine. The thread support or guide 8 also performs the additional function of providing means by which the threads may be evenly guided in their channels. In explanation it may be said that when the needles near the end of their return stroke there is sometimes more resistance in the eye of one needle than in the other thereby causing the thread to be laid irregularly in the mantle. By holding the finger or other means on the bight of the thread, the movement of the thread can be absolutely controlled by the operator with the aid of the thread guide 8.

Having described my invention, what I claim, and desire to secure by Letters Patent, is:—

1. In a machine for sewing the mouths of tubular fabric structures, the combination of means for corrugating such structures, suitable needles, means for passing the needles through the said structures and a threader comprising in its structure means for passing different portions of the same thread in opposite directions through the eyes of the needles.

2. In a machine for sewing the mouths of tubular fabric structures, the combination of means for corrugating such structures, suitable needles, means for passing the needles through the said structures, a threader comprising in its structure means for passing different portions of the same thread in opposite directions through the eyes of the needles and a thread support or guide for the thread coöperating with the threader.

3. In a machine for sewing the mouths of tubular fabric structures, the combination of means for corrugating such structures, suitable needles, means for passing the needles through the said structures, a threader comprising in its structure means for passing different portions of the same thread in opposite directions through the eyes of the needles and a single shaft *h* for operating the fabric-corrugating means and the threader.

4. In a machine for corrugating the mouths of tubular fabric structures, the combination of movable jaws and a needle mechanism, cam means for actuating the movable jaws and mutilated gearing for actuating the needle mechanism, the said cam means and mutilated gearing being so arranged with relation to each other as to operate the jaws and needles separately during different periods of time.

5. In a machine for corrugating the mouths of tubular structures, the combination of suitable fabric-corrugating means and a center member of a general wedge shape at its upper portion to facilitate the placing of the tubular structure thereon, the said member having upwardly opening slots to facilitate the removal of the tubular structure, the said slots and surface of the wedge shaped member being so located that the wedge-shaped member guides the tubular structure over said slots when the said tubular structure is put on the said wedge-shaped member.

6. In a machine for corrugating the mouths of tubular fabric structures, the combination of suitable fabric corrugating means, with means for operating same, a plurality of needles, and a two-part threader comprising means for passing different portions of the same thread in opposite directions through the eyes of the needles, combined with means for operating the two-part threader after the operating means for the fabric-corrugating means has operated.

7. In a machine for corrugating the mouths of tubular fabric structures, the combination of suitable fabric-corrugating means, means for operating same, suitable needles and a two-part threader adapted to draw different portions of the same thread in opposite directions through the eyes of the needles and a single means for operating the said threader and a connection between said last mentioned means and the means for operating the fabric-corrugating means so related as to put the threader in operation after the corrugation of the fabric has been accomplished.

8. In a machine for corrugating the mouths of tubular fabric structures, the combination with fabric-corrugating means and needles of a threader comprising a pair of oppositely moving pivoted arms, hooks carried thereby and common means for actuating both of the said arms.

9. In a machine for corrugating the mouths of tubular fabric structures, the combination of fabric-corrugating means, suitable needles and a threader mechanism comprised by a plurality of pivoted arms having thread-engaging means, a slide for actuating the said arms and cam mechanism for actuating the slide.

10. In a machine for corrugating the mouths of tubular fabric structures, the combination of fabric corrugating means, needle mechanism and a threader mechanism, of cam means for operating the threader mechanism, cam means for operating the corrugating mechanism and a lost-motion device for operating the needles, all arranged and constructed to effect the successive operation of the said three means.

11. In a machine for sewing the mouths of tubular fabric structures, the combination of means for corrugating such structures, suitable needles, and means for effecting the passage of the needles through the said structures including a moving needle guide mounted to move a limited distance with the needles which is moved by the said needle operating means in the direction of movement of the needles.

12. In a machine of the character described, the combination of a needle carrying head, fabric corrugating means, a movable needle guide, and a spring controlling the reciprocatory motion of the said needle guide, and needles carried by the said head.

13. In a machine of the character described, the combination of a needle carrying head, fabric corrugating means, a reciprocating guide in which the needles move, adapted to be moved by the needle operating means in the direction of movement of the needles a spring adapted to return the said needle guide, and needles carried by said head.

14. In a machine of the character described the combination of a needle carrying head, fabric corrugating means, a reciprocating guide in which the needles move, said guide being adapted to be moved forward by the said needle carrying head, a spring adapted to return the said needle guide, and needles carried by the said head.

15. In a machine for corrugating tubular or like structures, the combination of fabric corrugating means, needles adapted to draw the ends of a tie string through the tubular structure while corrugated, means for operating the needles, and means for engaging the loop of the tie string when the ends are being carried by the said needles, whereby the action of the string may be manipulated by the operator.

16. A center member comprising a base, means for opening the mantle and for corrugating the mantle extending away from the base in the same direction and together forming a passage in the nature of a slot opening away from the base in the same direction in which the opening means extends and coöperating needle mechanism.

SAMUEL COHN.

Witnesses:
A. M. VICTORS,
J. L. GRINDLE.